Figure 1:
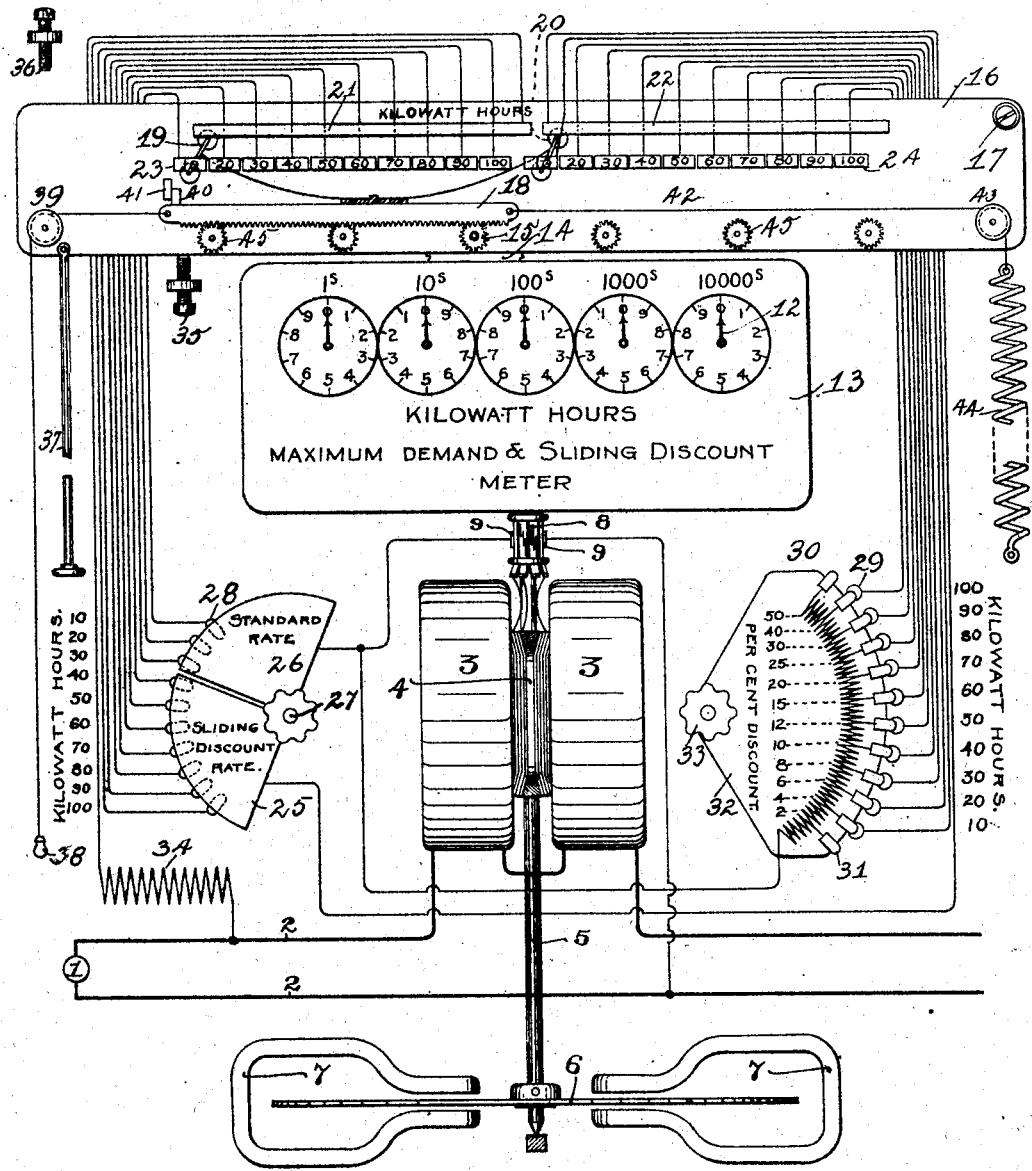

No. 796,046. PATENTED AUG. 1, 1905.
T. DUNCAN.
ELECTRIC METER.
APPLICATION FILED JULY 18, 1901. RENEWED JAN. 7, 1905.

2 SHEETS—SHEET 2.

WITNESSES:

INVENTOR.
Thomas Duncan
By Charles A. Brown Cragg & Belfield
ATTORNEYS.

UNITED STATES PATENT OFFICE.

THOMAS DUNCAN, OF CHICAGO, ILLINOIS.

ELECTRIC METER.

No. 796,046.        Specification of Letters Patent.        Patented Aug. 1, 1905.

Application filed July 18, 1901. Renewed January 7, 1905. Serial No. 239,972.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters, and has for its object the provision of a meter which may operate at one rate per unit of load or energy up to a given predetermined amount, at a reduced rate per unit of load or energy for a predetermined additional quantity of energy, a further reduced rate for another predetermined additional quantity of energy, &c.

By means of my invention I am enabled to provide a meter which is adapted to operate at one rate of operation to measure load or energy that the consumer is to be charged for at a given rate, the meter in its further operation in measuring a given additional quantity of energy operating at a reduced rate to afford the consumer discount agreed upon and in measuring additional given quantities of energy operating at further reduced speeds. Thus the consumer may be given a sliding discount. He may be charged a normal rate for a given minimum quantity of energy, a reduced rate for a given excess quantity of energy, a further-reduced rate for a further given excess quantity of energy, &c. For this purpose there is provided in the preferred embodiment of the invention a means for effecting a reduction in the torque of the meter after it has registered the normal or predetermined minimum quantity of units and after each of the predetermined excess number of units, which may be in the form of kilowatt-hours, ampere-hours, or the like. To effect this step-by-step reduction in the rate of operation of the meter per unit of load or energy, there is provided a resistance divided into sections, with each of which sections a trolley-contact is adapted to be connected, which contacts correspond to the various quantities of energy that may be measured by the instrument. Adjustable means are provided whereby these energy-contacts may be selected for connection with the sections of the resistance, so that the meter may operate a predetermined length of time without effecting the inclusion of the resistance in circuit with the meter-winding. A trolley-roller is actuated by the meter to be brought into engagement with the said energy-indicating contacts, the energy-contacts being alined to form trolley-contacts, the meter thus serving to bring the trolley gradually into engagement with the contacts connected with the discount resistance. The adjustable means for connecting the sections of the resistance with the trolley-contacts is preferably in the form of a switching device having a contact-blade and contacts, the contacts being electrically connected with the trolley-contacts, the contact-blade carrying the terminals of the resistance-sections adapted for engagement with the corresponding contacts, so that these terminals of the resistance-sections may be electrically connected with the trolley-contacts, whereby the time the trolley-roller actuated by the meter is to effect an inclusion of the resistance and successively the additional sections of the resistance is determined. The trolley-contacts preferably correspond each to ten kilowatt-hours. Thus if each meter during each period of operation is adapted to measure a maximum of one hundred kilowatt-hours the trolley-contacts are ten in number, each corresponding to ten kilowatt-hours, the trolley-contacts being successively arranged in increasing order of the energy consumption, the trolley-roller actuated by the meter moving from the trolley-contact corresponding to the lowest quantity of energy toward that corresponding to the highest quantity. By means of the aforesaid adjusting switching device the trolley-roller, actuated by the meter, may travel over a number of trolley-contacts that may be disconnected with the resistance, whereby the meter is caused to operate during the consumption of a given minimum quantity of energy without affording the consumer any discount. After this predetermined quantity of energy has been consumed the trolley-roller, actuated by the meter, is brought into connection with the trolley-contact corresponding to a given excess quantity of energy, whereby one section of the prediscount resistance may be brought into circuit with the meter-winding to afford the consumer the first discount. After this predetermined excess quantity of energy has been consumed the trolley-roller is brought by the meter into engagement with the trolley-contact corresponding to the next excess quantity of energy, whereby an additional section of the discount resistance is brought into circuit with the meter to afford a further reduced speed of the meter per unit of load or energy to secure to the consumer a further discount. Thus as the trolley is moved by the meter from contact to contact of the contacts electrically connected with the sections of the resistance these sections of the resistance are gradually and cumulatively included in circuit with the meter, so that a sliding discount is afforded the consumer.

I will explain my invention more fully by reference to the accompanying drawings, in which—

Figure 2:
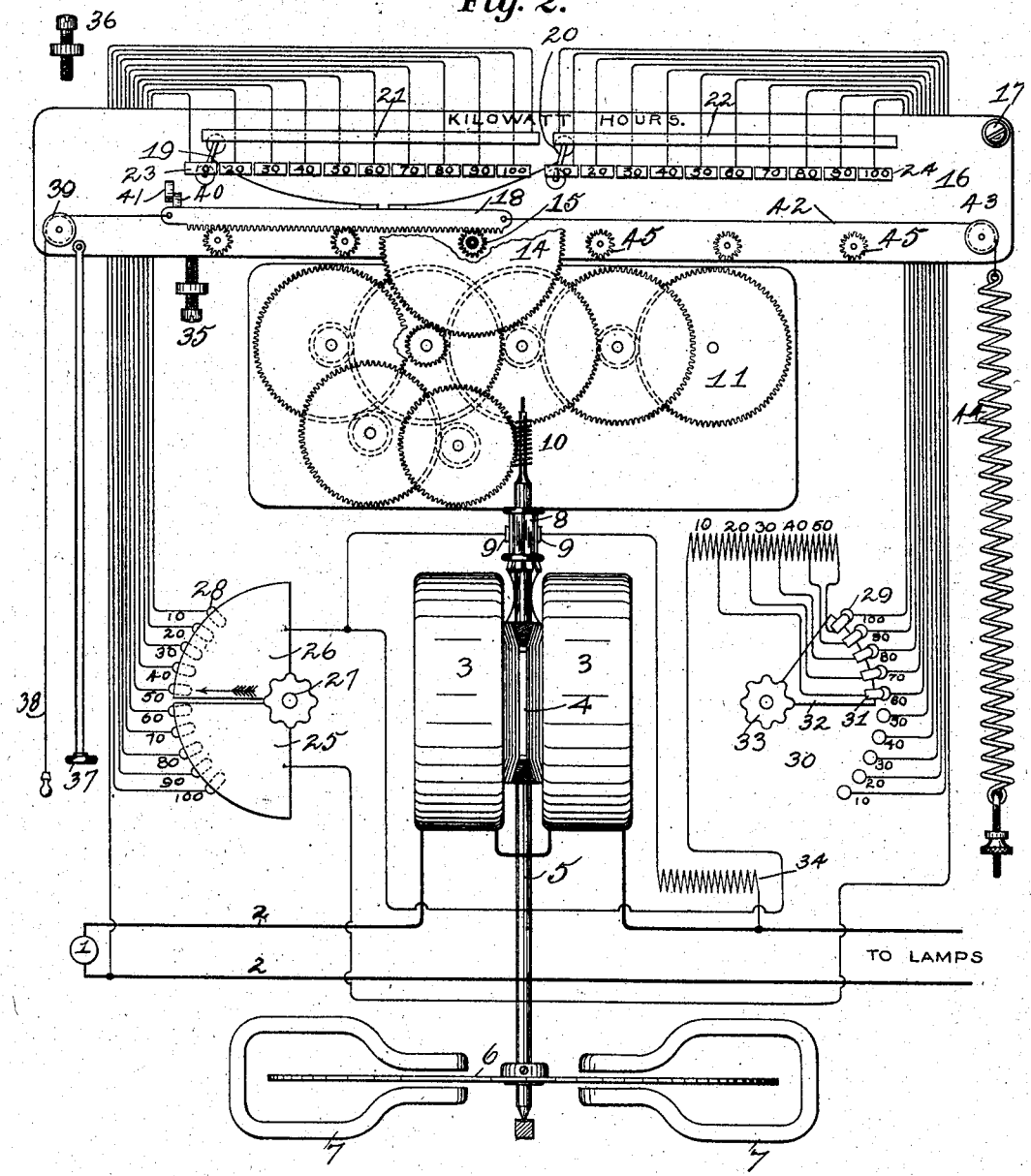

Figure 1 is a diagrammatic view of a system of electrical distribution with a meter constructed in accordance with my invention associated therewith. Fig. 2 is a view similar to Fig. 1, the reading-dial of the instrument being removed, while a modified arrangement of resistance is illustrated.

Like parts are indicated by similar characters of reference throughout both views.

I have illustrated in both figures a source of current 1, either direct or alternating, conveying current over the mains 2 2 to translating devices. A current field-winding, subdivided into coils 3 3, is included in one of the mains and produces a field proportional to the current. A pressure-winding, in this instance in the form of a commutated armature 4, is mounted upon a spindle 5, at the lower end of which is provided a damping-disk 6, arranged within the fields of permanent magnets 7 7. The spindle 5 supports the commutator 8 in engagement with commutator-brushes 9 9, which include the armature 4, in bridge of the transmission-mains, whereby a field is produced proportional to the pressure. There is thus organized the motor element of a wattmeter; but I do not wish to be limited to the precise form of meter illustrated for measuring loads. The upper end of the spindle is provided with a worm 10, which engages the wheels of a counting-train 11, that actuate the indexes 12 upon the reading-dial 13. This wheel-train includes a wheel 14, that is preferably distinct from the counting portion of the train, as far as the operation of the indexes is concerned, but is actuated at a suitable rate to include the prediscount resistance in circuit or otherwise modify the rate of operation of the meter at the proper time. This wheel 14 is provided with a pinion 15, coaxially arranged with respect thereto, this pinion 15 being insulated from the wheel 14 and the swinging frame 16, hinged at 17. The pinion 15 engages a horizontally-movable trolley rack-bar 18, upon which are mounted trolleys 19 and 20, each comprising two electrically-connected rollers, the upper rollers of the trolleys engaging, respectively, elongated contact-terminals or trolley-bars 21 22, while the lower trolley-rollers engage the lower sets of trolley-contacts 23 24. These trolleys are insulated from the bar 18. The trolley-bar 22 is connected with a contact-blade 25. A second contact-blade 26 is mounted upon the same rotating shaft 27 that supports the contact-blade 25, the contact-blades being, however, insulated from each other. These contact-blades 25 and 26 form parts of switching mechanism that also include contacts 28, electrically connected and equal in number to the trolley-contacts 23. By rotation of the blades 25 and 26 more or less of the contacts 28, and consequently the contacts 23, are brought into connection with the trolley bar or conductor 22, which trolley-bar at the same time is connected with one of the mains 2 by the trolley-rollers 19 engaging the trolley-bar 21, connected with the said main. The trolley-contacts 24 are in electrical connection with the contacts 29 of a preadjusting resistance 30, subdivided into sections and provided with terminal contacts 31, mounted upon a blade of insulating material 32, secured to a rotating handle 33. The resistance 30 has one terminal connected with the contact-blade 26 and also with the remaining transmission-main through the pressure winding or armature of the meter, a second and fixed resistance 34 being included in this armature-circuit to reduce the current flowing through the same. The set of trolley-contacts 23 and the set of trolley-contacts 24 correspond to different quantities of energy. For example, the first trolley-contact of each set corresponds to ten kilowatt-hours, the second trolley-contact of each set to twenty kilowatt-hours, thus increasing ten kilowatts successively, the last trolley-contact corresponding to one hundred kilowatt-hours, there being ten contacts in each set, each corresponding to ten kilowatt-hours. The bar 18 causes the trolleys to move together—that is, the trolleys are always in engagement with similar contacts of the duplicated sets of trolley-contacts 23 24.

Supposing, for example, the consumer is to receive no discount under fifty kilowatt-hours, the switch-blade 26 is brought into contact with the five buttons corresponding thereto in electrical connection with the first five buttons of the series of trolley-contacts 23. In this adjustment circuit may be traced from one limb of the transmission-circuit to the trolley-bar 21, the trolley 19, any one of the first five of the contact-trolleys 23 with which the trolley 19 happens to be in contact, the blade 26, the armature of the meter, to the other transmission-main of the system. Beyond this point the consumer may be allowed a sliding discount. For example, for consumption between fifty and sixty kilowatt-hours the consumer will get a discount of ten per cent.; between sixty and seventy kilowatt-hours, a discount of twenty per cent.; between seventy and eighty kilowatt-hours, a discount of thirty per cent.; between eighty and ninety kilowatt-hours, a discount of forty per cent., and between ninety and one hundred kilowatt-hours a discount of fifty per cent. The arrangement for each discount is illustrated in Fig. 2. When, now, the trolleys, as illustrated in Fig. 2, are brought into contact with the sixth trolley-contacts of the sets 23 24, current no longer can pass to the armature by way of the blade 26, but is forced to pass from the blade 25 in connection with the sixth trolley-contact of the set 23 and the succeeding contacts to the trolley-bar 22, the trolley 20, the sixth contact of the set of trolley-contacts 24, the sixth button 29, counting from the bottom, the first section of the resistance 30, the armature of the meter, thence to a main conductor, completing the armature-circuit. The torque of the meter is thus reduced ten per cent., according the consumer a discount of ten per cent. When the trolleys 19 and 20 come into connection with the seventh of the corresponding sets of trolley-contacts, two resistance-sections, causing a reduction in torque of the meter of twenty per cent. per unit of load or energy, are included in circuit with the armature, and so on throughout the remainder of the operation. In Fig. 1 the resistance 30 contains more sections than that illustrated in Fig. 2, provided for more gradual sliding discounts. The circuits may be traced in the same manner. Thus it is apparent that a standard meter may be adapted for a variety of sliding discounts and that the time these sliding discounts are to be brought into effect may be changed in accordance with individual conditions.

The swinging frame 16 normally rests upon a lower stop 35 to mesh the wheel 14 with the remainder of the wheel-train. At the end of the month or other stated period when the reading of the meter is taken the frame is elevated to permit the resetting of the trolley rack-bar 18 without effecting the restoration of the counting portion of the wheel-train, as it is desired to integrate the totalized measurements during a number of periods. An upper stop 36 is provided for the purpose of limiting the upward movement of the frame, while a rod 37, projecting through the casing of the instrument, may be employed for moving the frame. The trolley rack-bar may be provided with a cord 38 at its left end, passing over a pulley 39, by which the rack-bar may be restored to its initial position after each reading, a lug 40, carried by the rack-bar, by engagement with the lug 41 upon the swinging frame 16 serving to limit the movement of the rack-bar. This rack-bar may also have connected with its right-hand end a cord 42, passing over a pulley 43, to which cord may be secured a spring 44 or its equivalent for the purpose of assisting the counting-train in the operation of the rack-bar, the spring serving to overcome friction between the pinion 15 and the rack-bar 18 and also serving, preferably, to compensate for friction in the rest of the wheel-train. Supplemental pinions 45 may be provided for guiding the rack-bar in its horizontal movement.

I have thus shown circuits and controlling apparatus associated therewith for accomplishing the object of my invention; but I do not wish to be limited thereto.

It is obvious that many changes may be made from the specific embodiment of my invention herein shown and particularly described, and I do not, therefore, wish to be limited to the precise embodiment thereof herein set forth; but,

Having thus described my invention, I claim as new and desire to secure by Letters Patent—

1. The combination with a meter, of means governed thereby for changing the rate of operation of the meter per unit of load or energy when the meter has measured a predetermined quantity of energy, and further changing the rate of operation of the meter after it has measured a predetermined amount of energy in excess of the first quantity, substantially as described.

2. The combination with a meter, of means for successively effecting a predetermined number of changes of operation of the meter per unit of load or energy, and means operated by the meter to effect the application of the aforesaid means when the meter has measured predetermined quantities of energy, substantially as described.

3. The combination with a meter, of means for changing the rates of operation thereof per unit of load or energy, a circuit including the means, and a switch operated by the meter after the meter has operated to measure a predetermined quantity of energy to effect successively different changes in the circuit relation of the said means to cause the meter to operate successively at different rates of speed for different additional predetermined quantities of energy, substantially as described.

4. The combination with a meter, of means governed thereby for reducing the rate of operation of the meter per unit of load or energy when the meter has measured a predetermined quantity of energy and further reducing the rate of operation of the meter after it has measured a predetermined amount of energy in excess of the first quantity, substantially as described.

5. The combination with a meter, of means for successively effecting a predetermined number of reductions in the rate of operation of the meter per unit of load or energy, and means operated by the meter to effect the application of the aforesaid means when the meter has measured predetermined quantities of energy, substantially as described.

6. The combination with a meter, of means for reducing the rates of operation thereof per unit of load or energy, a circuit including the means, and a switch operated by the meter after the meter has operated to measure a predetermined quantity of energy to effect successively different changes in the circuit relation of the said means to cause the meter to operate successively at different rates of speed for different additional predetermined quantities of energy, substantially as described.

7. The combination with a meter, of means for effecting successive changes of rates of operation of the meter per unit of load or energy for successive predetermined amounts of energy consumed, and a wheel-train operated by the meter to effect the step-by-step application of the said means when the meter has measured a predetermined quantity of energy, substantially as described.

8. The combination with a meter, of means for reducing the rates of operation of the meter per unit of load or energy for successive predetermined amounts of energy consumed, and a wheel-train operated by the meter to effect the step-by-step application of the said means when the meter has measured a predetermined quantity of energy, substantially as described.

9. The combination with a meter, of means for effecting successive changes in the torque of the meter per unit of load or energy, and means operated by the meter after it has measured predetermined quantities of energy for effecting the application of the said torque-changing means, whereafter the meter may operate at different rates of speed per unit of load or energy for successive predetermined quantities of energy consumed, substantially as described.

10. The combination with a meter, of means for effecting successive reductions in the torque of the meter per unit of load or energy, and means operated by the meter after it has measured predetermined quantities of energy for effecting the application of the said torque-reducing means, whereafter the meter may operate at different rates of speed per unit of load or energy for successive predetermined quantities of energy consumed, substantially as described.

11. The combination with a meter, of a resistance divided into sections for inclusion in circuit with a meter-winding to reduce the torque of the meter, and mechanism operated by the meter for bringing the said resistance into circuit with the meter-winding step by step, as given predetermined quantities of energy are consumed, whereby the meter may be operated at successively different rates of discount, substantially as described.

12. The combination with a meter, of a resistance divided into sections for inclusion in circuit with a meter-winding to reduce the torque of the meter, and a switching device operated by the meter for bringing the said resistance into circuit with the meter-winding step by step, as given predetermined quantities of energy are consumed, whereby the meter may be operated at successively different rates of discount, substantially as described.

13. The combination with a meter, of a resistance divided into sections for inclusion in circuit with a meter-winding to reduce the torque of the meter, a switching device, and a wheel-train actuated by the meter and operating the switching device after the meter has successively measured predetermined quantities of energy to include the said resistance in circuit with the field-winding, section by section, as each predetermined quantity of energy is used, whereby the meter may operate at successively different discounts for different quantities of energy consumed, substantially as described.

14. The combination with a meter, of a resistance divided into sections for inclusion in circuit with a meter-winding to reduce the torque of the meter, a switching device, a wheel-train actuated by the meter and operating the switching device after the meter has successively measured predetermined quantities of energy to include the said resistance in circuit with the armature-winding, section by section, as each predetermined quantity of energy is used, whereby the meter may operate at successively different discounts for different quantities of energy consumed, counting-indexes operated by a portion of the said wheel-train, the balance of the wheel-train serving directly to operate the said switching device, and means whereby the switch-operating portion of the wheel-train may be separated from the balance of the wheel-train to reset the switching device without restoring the counting-indexes to their initial position, substantially as described.

15. The combination with a meter, of a resistance divided into sections for inclusion in circuit to successively reduce the torque of the meter, a switching device, a wheel-train actuated by the meter and operating the switching device after the meter has measured a predetermined quantity of energy to include the said resistance in circuit step by step as each predetermined quantity of energy is used to cause an operation of the meter varying per unit of load or energy as the successive quantities of energy are consumed, counting-indexes operated by a portion of the said wheel-train, the balance of the wheel-train serving directly to operate the said switching device, a rack-bar engaging the latter portion of the counting-train and carrying a trolley constituting a part of the switching device, the rack-bar being moved by the wheel-train into connection with the said resistance to include the same in circuit with said meter-winding, and a swinging frame supporting the switching device, rack-bar and the said balance of the wheel-train, whereby the counting portion of the wheel-train may be removed from the switch-actuating portion to permit a resetting of the rack-bar without effecting the restoration of the counting-indexes, substantially as described.

16. The combination with a meter, of a switch part 19 moved by the meter, a plurality of switching-contacts 23 corresponding to various quantities of energy, a switching device provided with contacts 28 also corresponding to different quantities of energy and connected with the aforesaid contacts, electrically-separate switching-blades 25 and 26, forming a part of the said switching mechanism, each adapted to be thrown into engagement with one or more of the contacts 28 or thrown out of engagement therewith, a sectional resistance 30 connected with the blade 26, a switch-blade 32 provided with terminals 31 of the sections of the resistance 30, and means whereby the blade 25 may be successively connected with the terminals 31 to include the resistance section by section in circuit with the meter-winding, substantially as described.

17. The combination with a meter, of a switch part 19 moved by the meter, a plurality of switching-contacts 23 corresponding to various quantities of energy, a switching device provided with contacts 28 also corresponding to different quantities of energy and connected with the aforesaid contacts, electrically-separate switching-blades 25 and 26, forming a part of the said switching mechanism, each adapted to be thrown into engagement with one or more of the contacts 28 or thrown out of engagement therewith, a sectional resistance 30 connected with the blade 26, a switch-blade 32 provided with terminals 31 of the sections of the resistance 30, a second set of trolley-contacts 24 in connection with a corresponding number of buttons 31, and a trolley 20 in electrical connection with the blade 25, adapted for successive engagement with the contacts 24, whereby the said resistance is included step by step in circuit with the meter-winding when the trolleys 19 and 20 engage the trolley-contacts corresponding to the buttons 28 in engagement with the blade 25, substantially as described.

18. The combination with a meter, of automatic means for changing the rate of operation of the meter per unit of load or energy when the meter has measured a predetermined quantity of energy, and further changing the rate of operation of the meter after it has measured a predetermined amount of energy in excess of the first quantity, substantially as described.

19. The combination with a meter, of automatic means for successively effecting a predetermined number of changes of operation of the meter per unit of load or energy, and means operated by the meter to effect the application of the aforesaid means when the meter has measured predetermined quantities of energy, substantially as described.

20. The combination with a meter, of automatic means for reducing the rate of operation of the meter per unit of load or energy when the meter has measured a predetermined quantity of energy, and further reducing the rate of operation of the meter after it has measured a predetermined amount of energy in excess of the first quantity, substantially as described.

21. The combination with a meter, of automatic means for successively effecting a predetermined number of reductions in the rate of operation of the meter per unit of load or energy when the meter has measured predetermined quantities of energy, substantially as described.

22. The combination with a meter, of means operated by the meter to effect successive predetermined changes in the rate of operation of the meter per unit of load or energy when the meter has measured predetermined quantities of energy, substantially as described.

23. The combination with a meter, of means operated by the meter to effect successive predetermined reductions in the rate of operation of the meter per unit of load or energy when the meter has measured predetermined quantities of energy, substantially as described.

In witness whereof I hereunto subscribe my name this 3d day of June, A. D. 1901.

THOMAS DUNCAN.

Witnesses:
GEORGE L. CRAGG,
HARVEY L. HANSON.